United States Patent

[11] 3,593,144

[72] Inventors Frank Coenning Reutlinger; Günther Hoffmann, Eningen, both of, Germany

[21] Appl. No. 759,305

[22] Filed Sept. 12, 1968

[45] Patented July 13, 1971

[73] Assignee Wandel u. Goltermann, Reutlinger, Wurttemberg, Germany

[32] Priority Sept. 13, 1967

[33] Germany

[31] P 15 91 814.6

[54] FREQUENCY GENERATOR WITH DECADIC ADJUSTMENT FOR USE IN FREQUENCY CHARACTERISTICS TESTS

17 Claims, 6 Drawing Figs.

[52] U.S. Cl. .......... 325/67, 325/184, 331/19, 331/39

[51] Int. Cl. .......... H04b 3/46, H03b 3/08

[50] Field of Search .......... 325/131, 153, 171, 184; 331/18, 19, 22, 30, 31, 37, 38, 39; 325/67

[56] References Cited

UNITED STATES PATENTS

| | | | |
|---|---|---|---|
| 2,914,733 | 11/1959 | Robuck et al. | 331/39 |
| 3,331,035 | 7/1967 | Strickholm | 331/39 X |
| 3,379,975 | 4/1968 | Niedereder | 325/131 |

*Primary Examiner*—Benedict V. Safourek

*Attorney*—Karl F. Ross

ABSTRACT: Frequency generator with several decades each having a 10-stage ring counter for the consecutive unblocking of respective frequency gates whose outputs are combined to yield a composite output frequency variable by uniform increments with an a presettable range, the limits of the range and/or intermediate points thereof being determined by a monitoring circuit including lines extending from the several ring counters a coincidence gate so as to generate a signal whenever the ring counters occupy a predetermined position corresponding to a selected output frequency.

Frank Coenning
Günther Hoffmann
INVENTORS.

BY

Karl F. Ross
Attorney

Frank Coenning
Günther Hoffmann
INVENTORS.

BY

Karl F. Ross
Attorney

FREQUENCY GENERATOR WITH DECADIC ADJUSTMENT FOR USE IN FREQUENCY CHARACTERISTICS TESTS

Our present invention relates to a frequency generator whose output frequency is progressively adjustable, within a predetermined range, by uniform increments $\Delta f$ small enough to approximate a linear frequency sweep. A system of this type, including a synthesizer which weights and combines individual digital frequencies from respective decadic networks to yield a linearly variable composite frequency, has been described in an article by Robert B. Fenwick and George H. Barry published 26 July 1965 in ELECTRONICS magazine.

Each decadic network of such a system includes 10 sources of fixed, equispaced digital frequencies which may be identical for all the networks. These digital frequencies are respectively applied to a set of 10 normally blocked gates adapted to be individually unblocked by the triggering of respective stages of an associated ring counter, there being one such counter assigned to each decadic network. As the counters are stepped at decadically related rates, e.g. under the control of a pulse train applied to the lowest-order counter and of periodic carry pulses transmitted to successively higher-order counters, different combinations of digital frequencies are delivered by the associated decadic networks to the synthesizer.

With this conventional system, a sawtooth-shaped frequency sweep with virtually linear rising flanks can be generated by feeding a continuous train of stepping pulses to the counter of the least significant decade. After $10^n$ stepping pulses (where $n$ represents the number of decades) all the counters return to zero whereupon the cycle is repeated. Thus, the limiting frequency of the sweep range equals the total number of counting stages times the frequency $\Delta f$, being invariable for any given set of counters.

An important object of our present invention is to provide means in such system for enabling free selection of an upper and/or lower sweep limit, within the available range of 0 to $10^n\Delta f$, with automatic stopping, repetition or reversal of the sweep upon attainment of either of these limits.

Another object of this invention is to provide simple and reliable means for ascertaining the instant or instants when the sweep passes through one or more freely preselectable frequencies, e.g. for the purpose of observing the transmission characteristics of a test pad on an oscilloscope screen with particular references to these selected frequencies.

It is also an object of our invention to provide a system of this general character having means for generating two different but coordinated (e.g. harmonically related, shifted or inverted) frequency sweeps, thus enabling the evaluation of the frequency response of passive or active test objects with large distortion factors, frequency displacement or frequency reversal.

In accordance with our instant invention we provide, in a decadically adjustable frequency generator of the aforedescribed character, monitoring means connected to the stages of each decadic counter for registering the state of actuation thereof, i.e. ascertaining whether or not a specific stage of each counter is in its triggered or conductive condition, as a measure of the output frequency whose magnitude at any point of the cycle is proportional to the numerical value registered on the counters. The monitoring means comprises, in accordance with a more particular feature of the invention, one or more coincidence gates each with as many inputs as there are decades in the system, these inputs being connected to individually preselected stages of respective counters. The output signal from the coincidence gate, whose occurrence signifies the generation of a corresponding output frequency, may be used to actuate a switch for modifying the operation of the control means stepping the counter, as by arresting the emitter of stepping pulses, by resetting the counters to restart the sweep at the other range limit, or by reversing the count to generate a symmetrically triangular sweep. Such a coincidence signal can also be used to determine the instant when the sweep passes a predetermined frequency level or bench mark.

According to another feature of our invention, the sweep rate may be modified (i.e. multiplied by powers of 10) with the aid of switchover means for selectively shifting the stepping pulses from the lowest-order counter to some higher-order counter, thus skipping the least-significant decade or decades. On the other hand, the pulse rate itself may be varied by the interposition of a frequency divider or multiplier between the pulse emitter and a standard-frequency oscillator driving same. A combination of both measures enables the changeover from a basic frequency range to a broader or narrower range whose upper and lower limits are multiples or submultiples of the corresponding limits of the basic range. A common actuating lever or the like may be provided for the control of the frequency divider or multiplier and of the switchover means respectively connected in the input and in the output of the pulse emitter.

In determining the frequency response of a test object, we may use the output of the aforedescribed frequency synthesizer to modulate a fixed intermediate frequency applied to the test object at a transmitting side thereof and to demodulate the resulting frequency spectrum at the receiving side of the test object so as to reconstitute, in a manner well known per se, the original intermediate frequency whose instantaneous amplitude and phase depend upon the attenuation (or gain) and the phase shift of the test object at the corresponding frequency level. If the test object has a large distortion factor giving rise to appreciable harmonics, the latter may be measured by the use on the receiving side of a second synthesizer tuned to a frequency range harmonically related to that of the transmitting-side synthesizer. If the test object is a modulator designed to shift the position of a sideband, the two synthesizers may be driven in step with each other but between different frequency limits; if the test object is a sideband inverter, the limits may or may not be different but the direction of sweep will be opposite, e.g. rising on the transmitting side and falling on the receiving side.

If the transmitting-side and receiving-side synthesizers are separated by long transmission channels (e.g. a radio link), it may not be practical to synchronize their respective counters by the direct transmission of stepping pulses thereto from a common source. In such a case, pursuant to a further feature of our invention, the two counting networks may be stepped by individually generated pulse trains of substantially identical cadence, the pulse rate at the receiving side being slightly faster than that at the transmitting side so that the receiving synthesizer comes to an end of its sweep (or arrives at some other reference level) slightly ahead of the transmitting synthesizer. The latter, upon reaching the selected reference frequency, causes the transmission of a special synchronizing signal (e.g. in the form of a sharp amplitude spike) to the receiver by way of the test object, thereby initiating the restarting of the remote frequency synthesizer.

The above and other features of our invention will become more fully apparent from the following detailed description, reference being had to the accompanying drawing in which.

Figure 1:
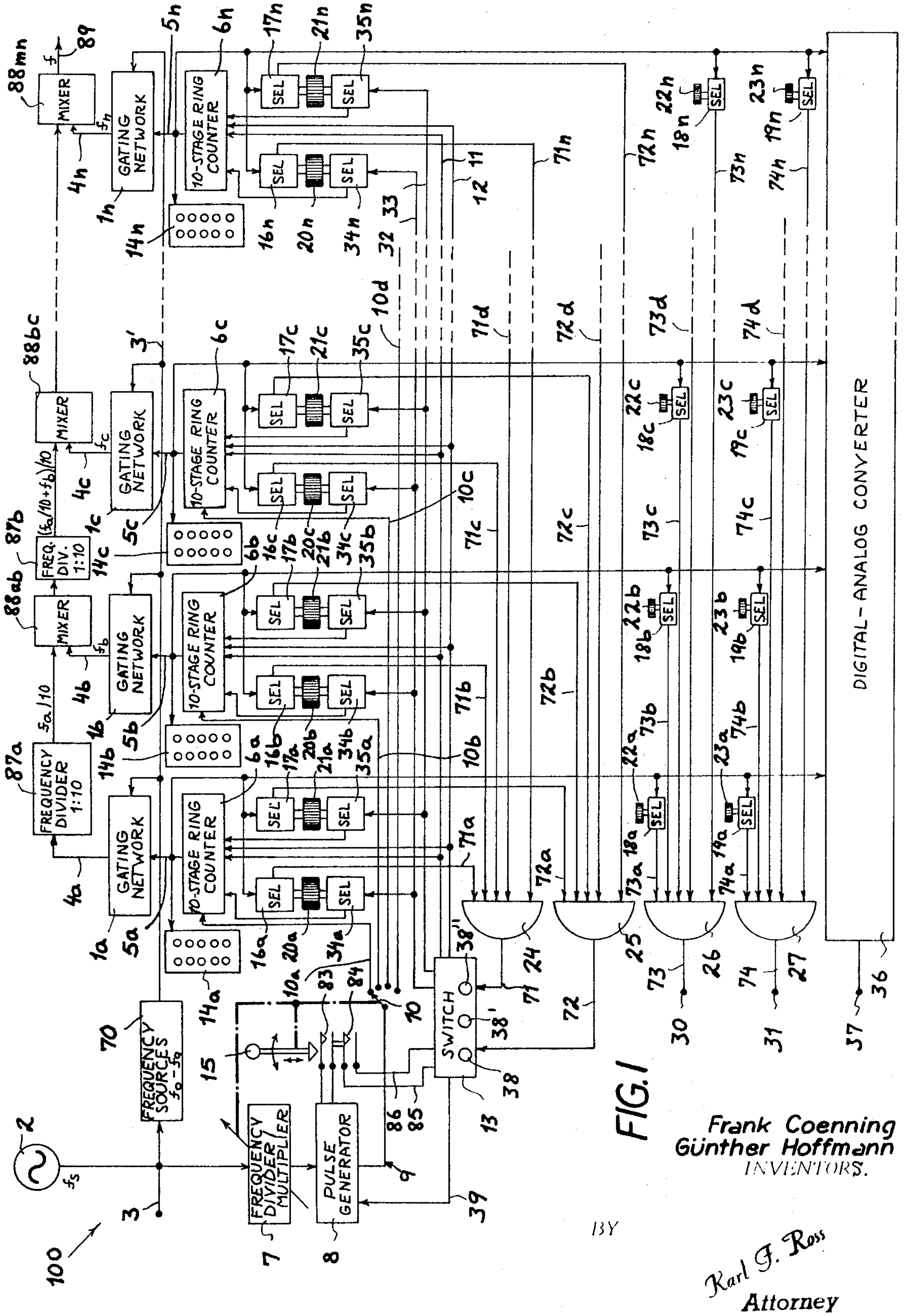
FIG. 1 is a block diagram representing a frequency generator according to the present invention.

We shall first refer to FIG. 1 showing the fundamental construction of a frequency generator 100 according to our invention. This generator is subdivided into a number of decades identified by the suffixes *a*, *b*, *c*, ... *n*. Since these decadic sections are substantially identical, with exceptions noted hereinafter, a description of one of them will generally suffice.

Figure 5:
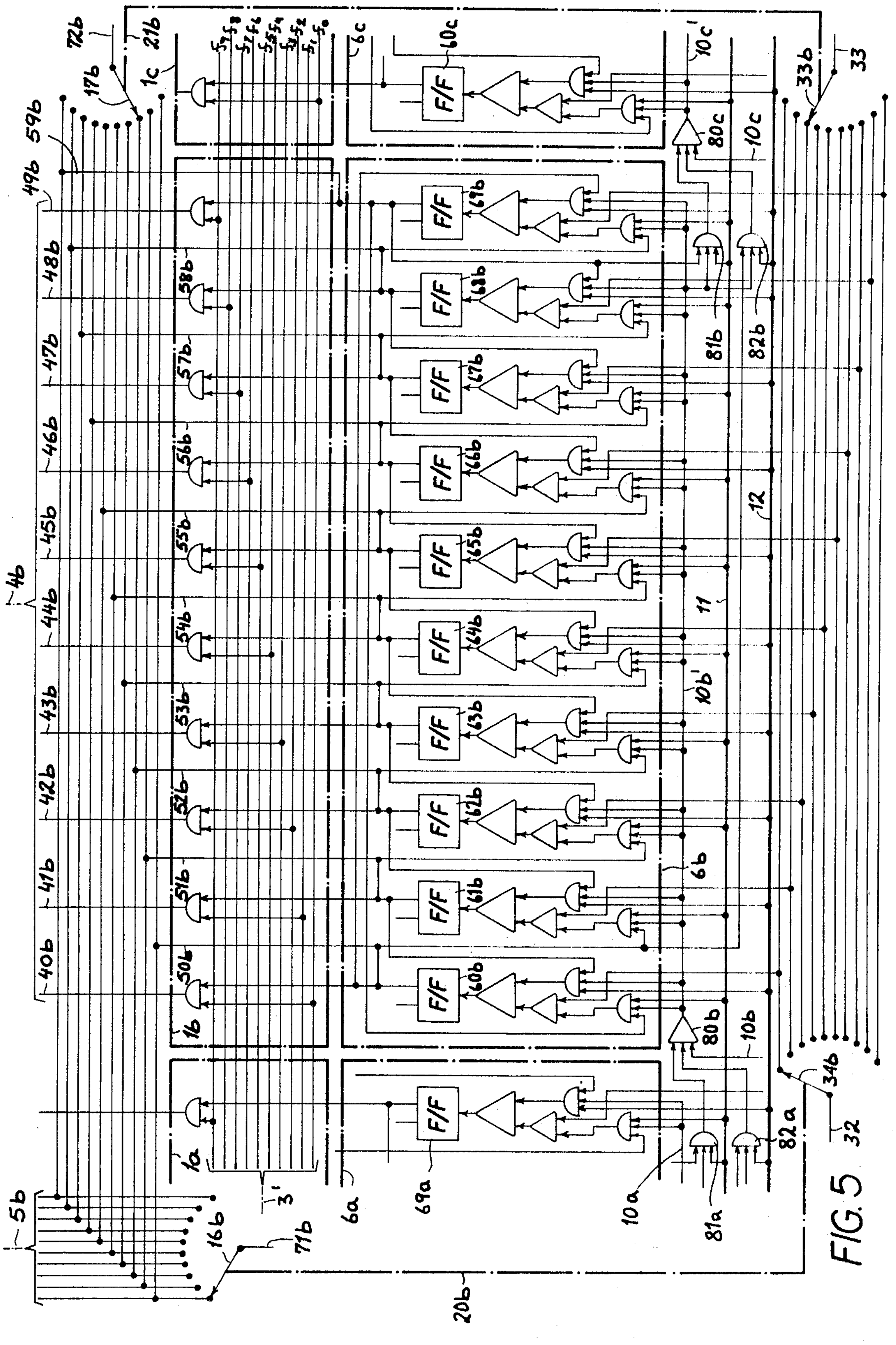
FIG. 5 is a more detailed circuit diagram of part of the system of FIG. 1.

Thus, we have illustrated in FIG. 5 the details of the second-lowest stage including a gating network 1*b* and a 10-stage ring counter 6*b*, together with the last stage 69*a* and the first stage 60*c* of the first and third ring counters 6*a* and 6*c*, respectively, as well as portions of the corresponding gating networks 1*a* and 1*c*. Common to all the gating networks 1*a*—1*n* is a group of 10 frequency sources $f_0$—$f_9$ whose outputs are derived from a local oscillator 2 producing a standard frequency $f_s$, this standard frequency being also available at an output terminal 3. The 10 frequency channels originating at a supply circuit 70 have been collectively designated 3′ and are individually illustrated in FIG. 5.

Standard frequency $f_s$ is also delivered to an adjustable frequency divider and/or multiplier 7 which in turn drives a pulse generator 8 at a rate depending on the setting of frequency changer 7. The train of stepping pulses emitted by generator 8 is fed over a lead 9 and a switch 10 via one of several (here four) leads 10*a*, 10*b*, 10*c*, 10*d* to one of the counters of the four least-significant decades, normally (as illustrated in FIG. 1) the lowest-order counter 6*a*. Frequency changer 7 and switch 10 are jointly controllable by means of an actuating handle 15 which can also be worked to close a nest of contacts 83, 84 for starting the pulse generator 8 and for enabling a switching unit 13 more fully illustrated in FIG. 6; contacts 84 are connected across a pair of leads 85, 86.

Unit 13 controls the energization of several groups of frequency selectors, specifically selectors 16*a*—16*n* establishing the lower limit of the frequency sweep, selectors 17*a*—17*n* establishing the upper limit of the sweep, selectors 34*a*—34*n* for resetting the counters preparatorily to a rising sweep, and selectors 34*a*—35*n* for resetting the counters preparatorily to a falling sweep. Selectors 16*a*—16*n* are paired within each decade with respective selectors 34*a*—34*n* for joint adjustment by common control knobs 20*a*—20*n*; selectors 17*a*—17*n* and 35*a*—35*n* are similarly paired for joint adjustment by common control knobs 21*a*—21*n*. As more fully described hereinafter with reference to FIG. 5, each of the ring counters 6*a* etc. has a bundle of 10 output leads collectively designated 5*a*, 5*b*, 5*c*, ... 5*n*. These leads extend to the associated gating networks 1*a*—1*n*, to the corresponding limit selectors 16*a*—16*n* and 17*a*—17*n* and to further selectors 18*a*—18*n*, 19*a*—19 *n* which together with these limit selectors form part of a monitoring circuit. Leads 5*a*—5*n* also serve for the selective energization of visual indicators 14*a*—14*n*, here shown as sets of 10 signal lamps each, and feed a digital/analog converter 36 having an output terminal 37. Selectors 18*a*—18*n* and 19*a*—19*n* are provided with individual control knobs 22*a*—22*n* and 23*a*—23*n*. Two bus bars 11, 12 extend from switching unit 13 to respective inputs of all the ring counters 6*a*—6*n*, for the purpose of determining the direction of counting (rising or falling) as described in greater detail hereinafter. Two other bus bars 32 and 33, also emanating from this unit, respectively control the resetting selectors 34*a*—34*n*, 35*a*—35*n* which in turn have output connections to the respective counters.

Output leads 71*a*—71*n* from all the selectors 16*a*—16*n* are connected to respective inputs of a coincidence gate 24 whose output conductor 71 extends to switching unit 13. In an analogous manner, output leads 72*a*—72*n* of selectors 17*a*—17*n* are connected via a coincidence gate 25 and an output conductor 72 thereof to unit 13. Other coincidence gate 26 and 27, with output conductors 73 and 74 ending at terminals 30 and 31, have their inputs connected to the outputs 73*a*—73*n*, 74*a*—74*n* of respective selectors 18*a*—18*n* and 19*a*—19*n*.

A conductor 39, extending from switching unit 13 to pulse generator 8, serves to halt the emission of stepping pulses in response to an output signal from coincidence gate 24 or 25. Other switching operations assigned to unit 13 can be performed with the aid of several pushbuttons 38, 38′ and 38″ as described hereinafter with reference to FIG. 6. Gating networks 1*a* etc. have output leads 4*a*—4*n* which carry respective digital frequencies $f_a$, $f_b$, $f_c$, ... $f_n$ selected from among the 10 input frequencies supplied by circuit 70. Lead 4*a* extends to a frequency divider 87*a* having a division ratio of 1:10, the output $f_a/10$ of this divider being applied to a mixer 88*ab* together with frequency $f_b$ from lead 4*b*. Mixer 88*ab*, in turn, works into another frequency divider 87*b* of like division ratio which delivers its output $(f_a/10+f_b)/10$ to a mixer 88 *bc* also receiving the frequency $f_c$ from lead 4*c*. In like manner, with the aid of further cascaded frequency dividers and mixers, there is finally produced a composite output frequency $f=10^{11n}f_a+10^{21n}f_b+10^{31n}f_c+\ldots+f_n$ on a lead 89 emanating from the last mixer 88*mn*.

For an understanding of the present invention it will be sufficient to assume that input frequencies $f_0$—$f_9$ are respective multiples of a unit frequency (such as the frequency $f_s$ of oscillator 2) of magnitude $10^{n11}\Delta f$ where $\Delta f$ is the minimum increment or quantum of output frequency $f$ so that, if $\Delta f=1$ Hz. and $n=6$, $f_0=0$, $f_1=0.1$ MHz., $f_2=0.2$ MHz. etc., with $f_9=0.9$ MHz. In practice, however, the "significant" digits represented by these 10 input frequencies and by their tenths, hundredths, thousandths etc. as produced by the dividers 87*a*, 87*b* etc. may be preceded by a fixed digit obtained from a constant heterodyning frequency which may be in the megacycle range. Thus, for example, supply circuit 70 may provide output frequencies of 5.0 to 5.9 MHz., with network 1*a* selecting, say, a frequency $f_a=5.2$ MHz. (representing a significant digit "2") which is then reduced to 0.52 MHz. in divider 87*a*. If the significant digit of the next decade is to be "4," the corresponding digital frequency $f_b=5.4$ MHz. will first be reduced by 0.5 MHz. (i.e. one-tenth the magnitude of the constant 5 MHz. frequency) to 4.9 MHz. which, when added to the aforementioned frequency of 0.52 MHz., yields a resultant frequency of 5.42 MHz. representing the two lowest-order significant digits augmented by the fixed digit "5." Reference in this connection may be made to commonly owned application Ser. No. 616,703 filed 16 Feb. 1967 by one of us, Günther Hoffmann, now U.S. Pat. No. 3,453,542.

We shall now discuss the construction of ring counter 6*b* and gating network 1*b* with reference to FIG. 5. The ring counter comprises a set of 10 counting stages 60*b*, 61*b*, 62*b*, ... 69*b* in the form of preferably transistorized flip-flops each having an output lead 50*b*, 51*b*, 52*b*, ... 59*b* which is energized in the set condition of the flip-flop. Each of these output leads is connected, together with a respective conductor of cable 3′, via an associated AND gate to one of the output leads 40*b*—49*b* of network 1*b*. These output leads together constitute the line 4*b* leading to the mixer 88*ab* in FIG. 1.

Each of the flip-flops 60*b*—69*b* has a single input connected, by way of several AND and OR gates, to the bus bar 11 common to all counters and to a conductor 10*b*′ is an extension of the lead 10*b* emanating from switch 10, being connected to it through an OR gate 80*b* which also receives the outputs of two AND gates 81*a* and 82*a* of the preceding decade. In an analogous manner, AND gates 81*b* and 82*b* work into an OR gate 80*c* which also receives the lead 10*c* from switch 10 and has an output conductor 10*c*′ to control the stepping of the subsequent decade. The stages of counter 6*a* are directly connected to lead 10*a* of switch 10 in the manner illustrated for stages 60*b*—69*b* and lead 10*b*′.

The selectors 16*b*, 17*b*, 34*b* and 35*b* have been diagrammatically illustrated in FIG. 5 as wipers with 10 bank contacts each, corresponding bank contacts of selectors 16*b* and 17*b* being tied to respective output leads 50*b*—59*b* whereas corresponding bank contacts of selectors 34*b* and 35*b* are jointly connected to the inputs of the respective flip-flops 60*b*—69*b* via cascaded OR gates.

The input circuits of these flip-flops also include the usual cross-connections between adjoining stages to condition either the next-higher or the next-lower stage for subsequent firing in the conductive state of any one stage, the firing sequence being determined by the energization of either of the two branches 11, 12 of the associated enabling circuit through corresponding AND gates. Simultaneous triggering of more than one stage per counter is prevented by conventional circuitry not shown.

The operation of counters 6*a*, 6*b* and 6*c* will now be described with reference to FIG. 5.

Let us assume that a continuous train of equispaced pulses is applied by the switchover circuit 9, 10 to conductor 10*a* multiplied to the input circuits of the several stages of counter 6*a*. With bus bar 11 energized, the flip-flops of this counter are progressively stepped in an ascending sequence until, upon the firing of flip-flop 69*a*, AND gate 81*a* is prepared for conduction as soon as the next stepping pulse occurs. This next stepping pulse, which restarts the counter 1*a* by triggering its "O" stage, briefly energizes the conductor 10*b*' which, again in conjunction with the potential of bus bar 11, advances the counter 1*b* by triggering the flip-flop thereof immediately following the one hitherto conducting and extinguishing the latter. If, for example, flip-flop 61*b* had been previously set so that frequency $f_1$ appears on lead 41*b*, this flip-flop is now reset and flip-flop 62*b* is set in its stead, causing the appearance of frequency $f_2$ on lead 42*b*. At the same time, an operating potential previously present on lead 51*b* is now shifted to lead 52*b*. When, after repeated energization of conductor 10*b*', flip-flop 69*b* is triggered, AND gate 81*b* is prepared for subsequent conduction and, upon the next energization, applies a voltage pulse to conductor 10*c*' with resulting stepping of counter 6*c*.

If bus bar 12 had been energized in lieu of bus bar 11, the firing of the zero-stage flip-flop of counter 6*a* would have conditioned the AND gate 82*a* so that the next stepping pulse, apart from firing the flip-flop 69*a*, would also have briefly energized the conductor 10*b*' to trigger one of the flip-flops of counter 6*b*, i.e. the flip-flop immediately preceding the one heretofore conducting. By the same token, a setting of flip-flop 60*b* would have conditioned the AND gate 82*b* for subsequent pulsing of counter 6*c* via conductor 10*c*' concurrently with the reoperation of flip-flop 69*b*.

In the illustrated position of wipers 16*b* and 34*b*, lead 71*b* will carry voltage whenever flip-flop 60*b* is set; conversely, if voltage of the proper polarity is applied to lead 32, this flip-flop will be fired to the exclusion of the one previously operated. Similarly, in the illustrated positions of wipers 17*b* and 35*b*, flip-flop 62*b* can be set by potential on lead 33 and, upon such setting, will apply voltage to lead 72*b*. Thus, during normal stepping of the counter by a continuous pulse train as described above, and with leads 32 and 33 open-circuited, each of leads 71*b* and 72*b* will be periodically energized for an interval corresponding to substantially one-tenth of the operating cycle of counter 1*b*, the time position of this interval within the operating cycle depending on the setting of wiper 16*b* or 17*b*.

It will therefore become apparent that the coincidence gate 24 of FIG. 1 conducts only at the instant when wiper 16*b* and corresponding wipers of all the other counters are concurrently connected to potential by the firing of the flip-flops respectively associated with their selected bank contacts. In like manner, coincidence gate 25 conducts only at the instant of concurrent firing of the flip-flops associated with the bank contacts selected by wiper 17*b* and corresponding wipers of all the other counters. The combined setting of wipers 16*a*—16*n* represents a first numerical value constituting the lower limit of the desired frequency sweep; similarly, the combined setting of wipers 17*a*—17*n* represents a second numerical value constituting the upper limit of that sweep. Selectors 18*a*—18*n* and 19*a*—19*n* operate in the same manner to generate an output signal on terminal 30 or 31 whenever the pattern of conductivity of the counters, and therefore the magnitude of the output frequency *f*, corresponds to a chosen multidigit value which may or may not coincide with one of the aforementioned frequency limits. Terminal 37 carries a voltage which is constant in the absence of stepping pulses, its value depending on the setting of the several counters, and which during progressive stepping of the counters or "-frequency wobbling" rises or falls substantially linearly in conformity with the frequency sweep.

Figure 6:
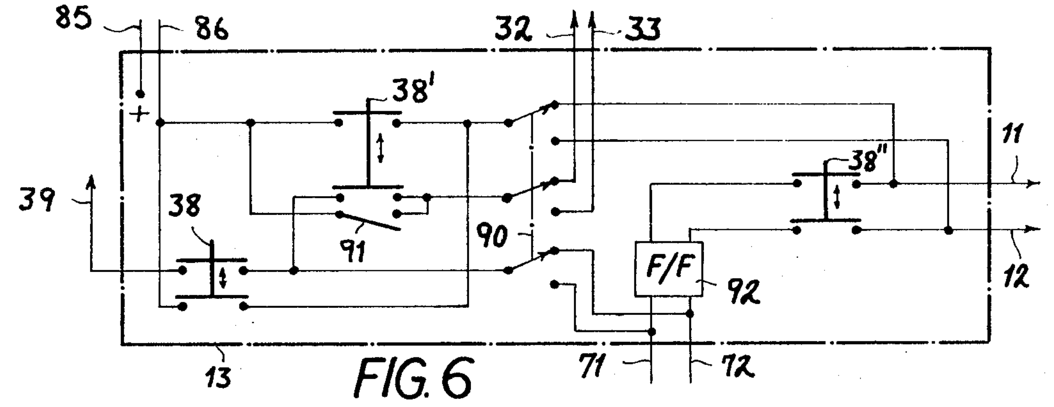
FIG. 6 is a detailed circuit diagram of another unit shown in FIG. 1.

The frequency generator shown in FIG. 1 is capable of a variety of modes of operation which can be selected with the aid of pushbuttons 38, 38', 38'' on switching unit 13. As shown in FIG. 6, pushbutton 38 is a switch which, upon closure, connects either the conductor 71 or the conductor 72 to the pulse-stopping lead 39, depending on the position of a switch 90 which in the drawing is shown to complete the connection of conductor 72. At the same time, upon closure of contacts 84 (FIG. 1) by the manual actuator 15, bus bar 11 is energized from a voltage source (+) via leads 85 and 86 so that the counters are enabled for forward stepping. With contacts 83 closed by the same handle motion to start the pulse generator 8, the counters are stepped until the coincidence gate 25 registers the upper limit of the frequency sweep whereupon lead 39 is energized to stop the emission of pulses from generator 8. Thus, the pulse on lead 39 may be used to release an electromagnetic or electronic relay actuated by the initial closure of contacts 38. Another closure of these contacts may then restart the counters from any lower frequency level to which they may meanwhile have been readjusted. The closure of a switch 91 energizes either of leads 32 and 33 (here lead 32) to reset the counters to a numerical value determined by the positions of wipers 34*a*—34*n* (or 35*a* — 35*n*).

If the switch 90 had been in its alternate position, closure of switch 39 would have resulted in a backward counting until the output frequency *f* had dropped to the lower sweep limit determined by the setting of wipers 60*a*—60*n*; the arrival of the system at this lower limit would have been signaled by energization of lead 71 coincidence gate 24.

With switch 38 open but switch 38' closed, bus bar 11 is again energized but the connection to pulse-stopping lead 39 is interrupted. A pulse on conductor 72, indicating the attainment of the upper sweep limit, is now conveyed to conductor 32 which instantly energizes the counting stages selected by wipers 34*a*—34*n*, thereby resetting the frequency generator to the lower limit of its selected sweep. Since pulse generator 8 has not been deactivated, the forward count resumes immediately and the sweep is repeated according to a rising sawtooth pattern. If switch 90 had been in its alternate position, the slope of the sawtooth flanks would have been negative, with the backward count restarted at the upper sweep limit (through energization of conductor 33) whenever the lower limit was reached (voltage on conductor 71).

Pushbutton switch 38'', when depressed, connects bus bars 11 and 12 to two alternate outputs of a flip-flop 92. With this flip-flop in a reset condition, bus bar 11 is energized and the counters are stepped in the forward sense. As soon as the upper sweep limit is reached, voltage of conductor 72 sets the flip-flop 92 to deenergize bus bar 11 and to energize bus bar 12 so that the sweep is reversed. At the lower limit of the range, voltage on conductor 71 again resets the flip-flop 92 to restart the sequence. The sweep pattern, therefore, has a triangular wave shape with symmetrically sloping flanks.

Figure 2:
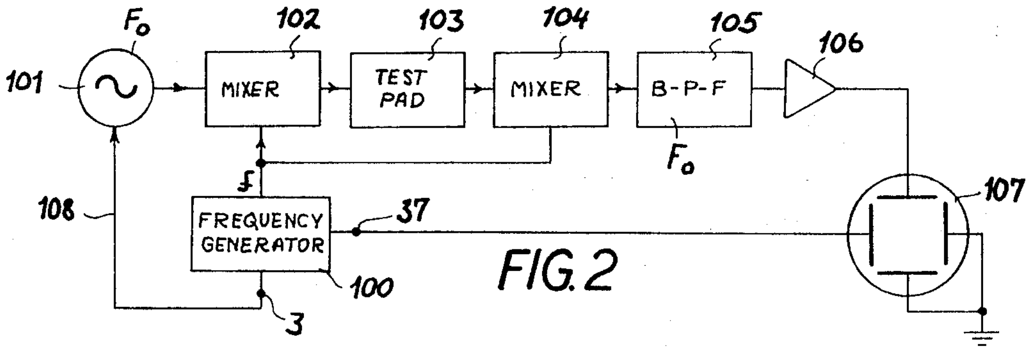
FIGS. 2, 3 and 4 are block diagrams of different circuit arrangements for the examination of test objects with systems of the type shown in FIG. 1.
Figure 4:
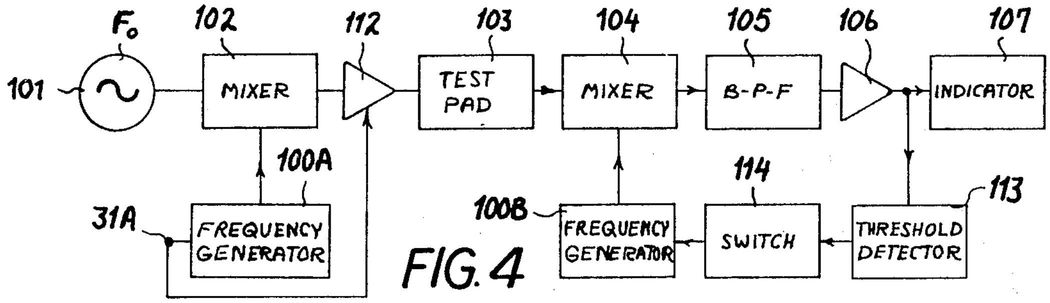
Figure 3:
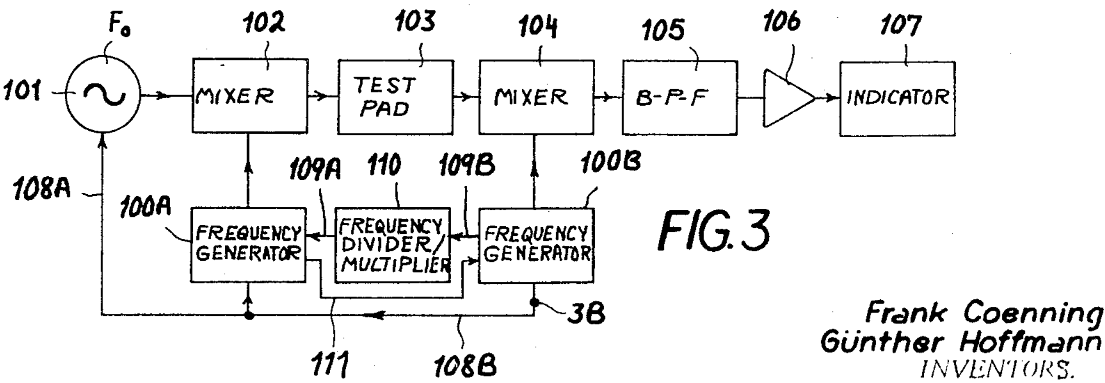

Reference will now be made to FIGS. 2—4 which illustrate the practical application of our improved frequency generator to a system for determining the frequency response of an impedance pad or other test object.

An oscillator 101 generates a fixed intermediate frequency $F_o$ which is blended in a mixer 102 with the output frequency *f* of generator 100. Mixer 102 is disposed on the input or transmitting side of a test pad 103 receiving the modulation products $F_o+f$ which may undergo collective or selective attenuation and/or phase shifts on passing through the object 103. The output of test pad 103 is demodulated in a second mixer 104 which also receives the variable frequency *f* from generator 100. The mixer 104 on the receiving sides of the test object reconstitutes the intermediate frequency $F_o$, which is selected by a band-pass filter 105 and, after amplification at 106, is delivered to a visual indicator here shown as the screen of an oscilloscope 107. More particularly, the vertical sweep circuit of the oscilloscope is connected to the output of amplifier 106 while the horizontal sweep circuit is supplied with the aforedescribed analog voltage from terminal 37 of generator 100. A lead 108 from generator terminal 3 serves to lock the oscillator 101 in step with oscillator 2 (FIG. 1) of generator 100.

In the system of FIG. 2 the modulating and demodulating mixers 102 and 104 are concurrently energized in parallel by the output of a single frequency generator 100. This system, therefore, will measure only the amplitude variations (or, upon substitution of a suitable phase indicator for the oscilloscope 107 the phase variations) of the variable frequency $f$ as it passes through the test object 103.

In FIG. 3 we show a system similar to that of FIG. 2 wherein, however, two separate but substantially identical frequency generators 100A and 100B have been substituted for the single generator 100. Generator 100A, feeding the transmitting-side mixer 102, is synchronized with generator 100B which, via a line 109A, 109B, delivers the stepping pulses from circuit 8 (FIG. 1) of generator 100B to the switchover circuit 9, 10 of generator 100A; a frequency divider and/or multiplier 110 may be inserted, as shown, between line sections 109A and 109B to enable the two generators to operate in different frequency ranges as described hereinabove. A further connection 111 serves to transmit start and stop signals from generator 100A to generator 100B. A line 108B, extending from terminal 3B of generator 100B, leads to the oscillator 2 of generator 100A and has a branch leading to oscillator 101 for locking these two oscillators in step with its own oscillator 2.

FIG. 4 represents a system wherein a transmitting and receiving stations containing mixers 102 and 104 are so far apart that it would not be practical to provide a separate synchronizing connection as shown at 109A, 109B in FIG. 4 between the two generators 100A and 100B. In this system, therefore, we prefer to use two reasonably synchronous standard oscillators (2, FIG. 1) but to let the oscillator and therefore the pulse rate of generator 100B run slightly faster than that of generator 100A, with deactivation of generator 100B at a limit of its sweep as described above in connection with FIG. 6 (pushbutton 38 operated). When, shortly thereafter, the output of generator 100A arrives at the same frequency limit, a synchronizing signal is sent to generator 100B via the transmission link including the test object 103 to perform a switching operation equivalent to momentary closure of switch 91 in FIG. 6 and reoperation of pulse generator 8 to restart the cycle. In this way, substantial synchronization between the two generators 100A and 100B is achieved. To transmit the synchronizing signal, an amplifier 112 between mixer 102 and test pad 103 is briefly pulsed by a voltage on terminal 31A (corresponding to terminal 31 of FIG. 1, it being assumed that selectors 19$a$—19$n$ have been preset to either the upper or the lower range limit) to indicate the end or the beginning of a sweep cycle at the transmitting station; the resulting amplitude spike is detected by a treshold circuit 113 which triggers a switch 114 performing the restarting operations just described.

In the system of FIG. 2, where the two mixers 102 and 104 are supplied by the same frequency generator 100, the sweep rate of the latter is usually not critical and can be varied at will; thus, the cadence of its pulse source 8 may be constant or may vary continuously or in steps. The same is true of the system of FIG. 3 in which the two frequency generators 100A, 100B are closely synchronized; this system, however, offers all the aforementioned possibilities of frequency shift and/or transposition. Thus, for example, we may adopt the second mode of operation (pushbutton switch 38', FIG. 6, closed) with the reversing switch 90 occupying one position in generator 100A and the other position in generator 100B to provide mutually inverted sawtooth sweeps. For harmonics detection, we may utilize the frequency changer 7 and/or the switchover circuit 9, 10 of either or both frequency generators. With switch 10 on its second bank contact, for example, the stepping pulses from source 8 are applied directly to conductor 10$b'$ via OR gate 80$b$ (FIG. 5) so that, with counter 6$a$ idle, all other counters are stepped at 10 times their normal rate whereby the fifth harmonic can be selected by halving the frequency of oscillator 2 at divider 7; naturally, the sweep limits of the two generators at both ends of their ranges must be readjusted with the same harmonic relationship of 5:1. In order that this harmonic relationship may be substantially preserved throughout the entire sweep, intermediate frequency $F_o$ should be small compared with the lowest value of output frequency $f$.

We claim:

1. A frequency generator comprising:
a plurality of decadic counters each having 10 cyclically triggerable stages;
a like plurality of decadic networks each assigned to passed by said gates and for combining the frequencies so respective counter, each of said networks including 10 normally blocked gates and 10 sources of fixed equispaced frequencies respectively connected to said gates;
stepping means for cyclically triggering the stages of said counters at decadically related rates to register a progressively changing multidigit numerical value on said counters, the stages of each counter being connected to respective gates of the associated network for unblocking same upon triggering by said control means to pass the corresponding fixed frequency;
a frequency synthesizer including circuitry for weighting the frequencies passed by said gates and for combining the frequencies so weighted into a composite output frequency proportional to said numerical value;
monitoring means connected to the stages of each counter for registering the state of actuation of said stages as a measure of said output frequency, said monitoring means comprising a coincidence gate with a number of inputs corresponding to the number of said counters;
adjustable presetting means for selectively connecting each of said inputs to any one stage of a respective counter;
and control means connected to an output of said coincidence gate for modifying the operation of said stepping means upon said composite output frequency attaining a value selected by said presetting means.

2. A frequency generator as defined in claim 1 wherein said stepping means includes an emitter of stepping pulses connected in parallel to the stages of one of said counters for periodically enabling same.

3. A frequency generator as defined in claim 2 wherein said control means includes switch means connected to said emitter for discontinuing said stepping pulses upon attainment of the selected value.

4. A frequency generator as defined in claim 1, further comprising switchover means for selectively applying the pulses from said emitter to the stages of any counter in the least significant decades.

5. A frequency generator as defined in claim 4, further comprising oscillator means for generating a standard frequency, said emitter being connected to be driven by said oscillator means, and a harmonic frequency changer in the connection between said oscillator means and said emitter for selectively varying the cadence of said stepping pulses.

6. A frequency generator as defined in claim 5 wherein said frequency changer and said switchover means are provided with a common actuator.

7. A frequency generator as defined in claim 1 wherein said counters are provided with visual indicators respectively connected to the stages thereof for displaying the state of actuation of said stages.

8. A frequency generator comprising:
a plurality of denominational counters each having a multiplicity of cyclically triggerable stages;
a like plurality of denominational networks each assigned to a respective counter, each of said networks including a like multiplicity of normally blocked gates and as many sources of fixed frequencies of progressively different magnitudes respectively connected to said gates;

stepping means for cyclically triggering the stages of said counters at denominationally related rates to register a progressively changing multidigit numerical value on said counters the stages of each counter being connected to respective gates of the associated network for unblocking same upon triggering by said control means to pass the corresponding fixed frequency;

a frequency synthesizer including circuitry for weighting the frequencies passed by said gates and for combing the frequencies so weighted into a composite output frequency proportional to said numerical value;

monitoring means connected to the stages of each counter for registering the state of actuation of said stages as a measure of said output frequency, said monitoring means comprising a coincidence gate with a number of inputs corresponding to the number of said counters;

adjustable presetting means for selectively connecting each of said inputs to any one stage of a respective counter;

and control means connected to an output of said coincidence gate for modifying the operation of said stepping means upon said composite output frequency attaining a value selected by said presetting means.

9. A frequency generator as defined in claim 8 wherein said control means includes switch means for arresting said stepping means upon attainment of the selected value.

10. A frequency generator as defined in claim 8 wherein said control means further includes an enabling circuit for sequentially making the stages of each counter responsive to said stepping means, and switch means for connecting the output of said coincidence gate to said enabling circuit to vary the sequence of actuation of said stages.

11. A frequency generator as defined in claim 10 wherein said enabling circuit has a first branch for actuating said stages in a forward-counting sequence and a second branch for actuating said stages in a backward-counting sequence, said switch means being effective in an energized condition of one of said branches to deenergize same and energize the other of said branches, thereby reversing the sense of counting in response to an output signal from said coincidence gate.

12. A frequency generator as defined in claim 10, further comprising receiving means operable by said switch means to trigger a preselected stage of each counter in response to an output signal from said coincidence gate.

13. A system for determining the transmission characteristics of a transmitting station and a receiving station, at least one of said stations including a frequency generator as defined in claim 8, modulating means at said transmission station for combining a progressively varying output frequency from said frequency synthesizer with a fixed intermediate frequency and applying the modulation products to a test object demodulating means at said receiving station for reconstituting said intermediate frequency from a range of frequencies sequentially recovered from said test object, and measuring means connected to receive the reconstituted intermediate frequency from said demodulating means.

14. A system as defined in claim 13 wherein said stations are provided with substantially identical frequency generators, said demodulating means being connected to receive the output frequency of the frequency generator of said receiving station.

15. A system as defined in claim 14, further comprising a synchronizing connection between the stepping means of said frequency generators.

16. A system as defined in claim 14 wherein said stations are interconnected only by a transmission link including said test object, the stepping means at said receiving station having a slightly higher operating cadence than the stepping means at said transmitting station and being provided with switch means responsive to an output signal from the coincidence gate of the associated monitoring means for halting the count upon the output frequency of the associated frequency synthesizer reaching a predetermined level, further comprising signal-generator means at the transmitting station responsive to attainment of a corresponding level by the output frequency of the frequency synthesizer thereof to transmit a synchronizing signal to the control means of the frequency generator at said receiving station for restarting the stepping means thereof.

17. A system as defined in claim 13 wherein said measuring means comprises an oscilloscope, said monitoring means including a digital-analog converter for generating an electric variable proportional to said numerical value, said oscilloscope having a sweep circuit connected to the output of said converter.

PO-1050 (5/69)

UNITED STATES PATENT OFFICE
CERTIFICATE OF CORRECTION

Patent No. 3,593,144 Dated July 13, 1971

Inventor(s) Frank COENNING et al

It is certified that error appears in the above-identified patent and that said Letters Patent are hereby corrected as shown below:

Column 4, line 8, read -- $10^{1-n} f_a$ -- for "$10^{11n} f_a$" ;

line 9, read -- $+ 10^{2-n} f_b + 10^{3-n} f_c$ -- for "$+ 10^{21} f_b + 10^{31} f_c$" ;

line 14, read -- $10^{n-1}$ -- for "$10^{n11}$" ;

Column 5, line 5, read -- multipled -- for "multiplied" ;

Column 8, line 13 (claim 1), read -- a -- for "passed" ; cancel line 14.

Signed and sealed this 30th day of May 1972.

(SEAL)
Attest:

EDWARD M.FLETCHER,JR.
Attesting Officer

ROBERT GOTTSCHALK
Commissioner of Patents